United States Patent

Smeets

[11] Patent Number: 5,533,940
[45] Date of Patent: *Jul. 9, 1996

[54] DRIVE BELT

[75] Inventor: Paulus M. Smeets, Tilburg, Netherlands

[73] Assignee: Van Doorne's Transmissie B.V., Tilburg, Netherlands

[*] Notice: The term of this patent shall not extend beyond the expiration date of Pat. No. 5,439,422.

[21] Appl. No.: 436,152

[22] Filed: May 8, 1995

Related U.S. Application Data

[63] Continuation of Ser. No. 248,264, May 24, 1994, Pat. No. 5,439,422.

[51] Int. Cl.⁶ .................................................. F16G 1/20
[52] U.S. Cl. .................................................. 474/242
[58] Field of Search ........................... 474/201, 240–244, 474/265

[56] References Cited

U.S. PATENT DOCUMENTS

| | | | |
|---|---|---|---|
| 4,610,648 | 9/1986 | Miranti, Jr. | 474/242 |
| 4,832,671 | 5/1989 | Satoh | 474/242 |
| 4,854,919 | 8/1989 | van Lilth | 474/25 |
| 4,976,663 | 12/1990 | Hendrikus | 474/242 |
| 5,004,450 | 4/1991 | Ide | 474/242 |
| 5,169,369 | 12/1992 | Masuda et al. | 474/242 |

FOREIGN PATENT DOCUMENTS

| | | | |
|---|---|---|---|
| 0151396 | 8/1985 | European Pat. Off. | F16G 5/16 |
| 4083941 | 3/1992 | Japan | F16G 5/16 |

*Primary Examiner*—Michael Powell Buiz
*Attorney, Agent, or Firm*—Vinson & Elkins

[57] ABSTRACT

The invention relates to a drive belt, in particular suitable for a continuously variable transmission, the configuration of the drive belt being such that the tilting of the transverse elements of the drive belt in the pulley of the continuously variable transmission is largely overcome. The drive belt can be produced in a relatively simple and cheap way, offers a higher efficiency and less wear.

4 Claims, 2 Drawing Sheets

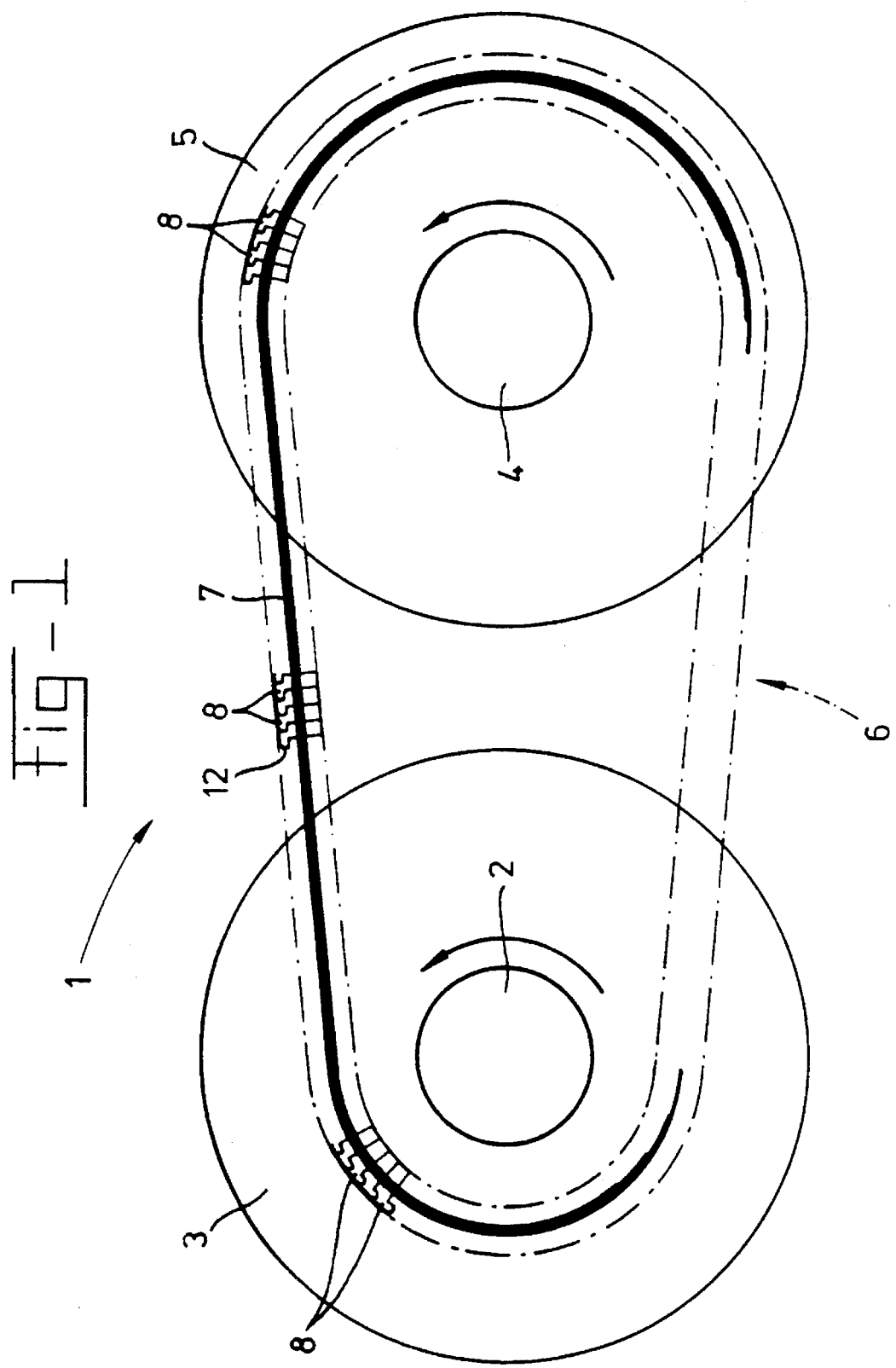

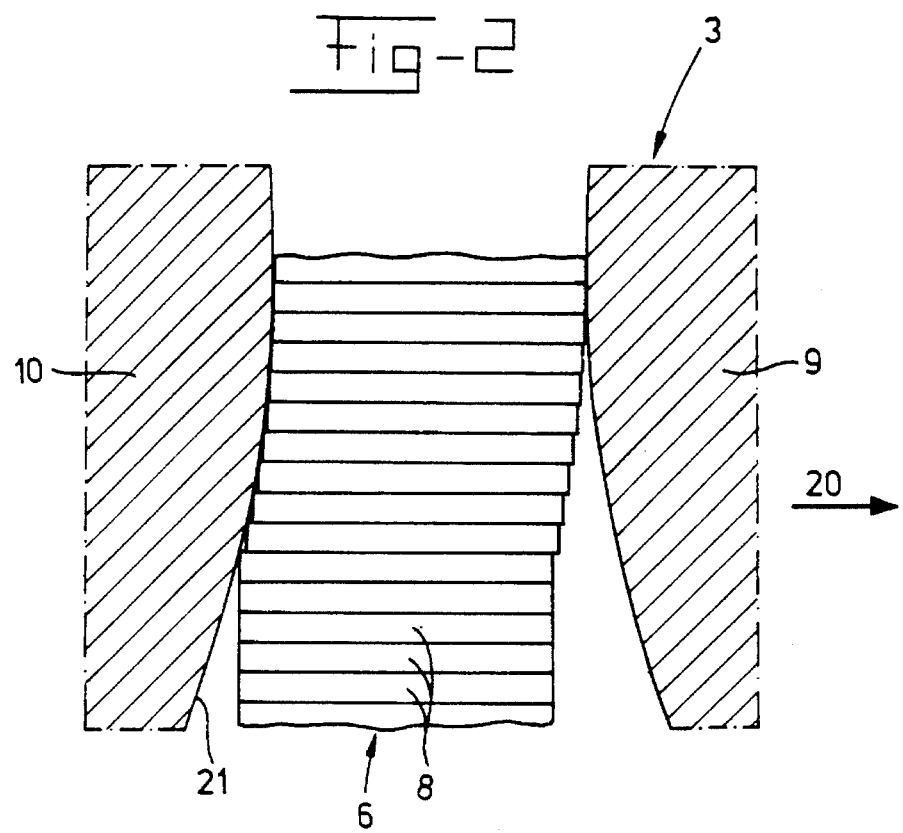
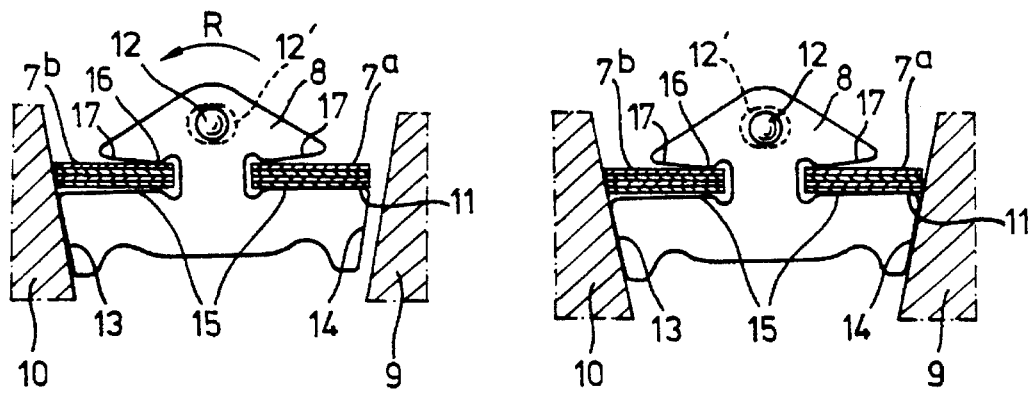
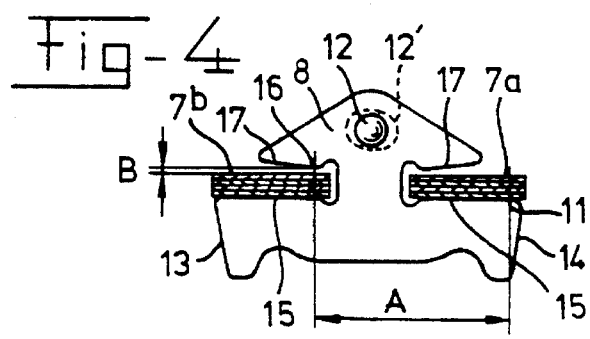

DRIVE BELT

This application is a continuation of application No. 08/248,264, filed May 24, 1994, now U.S. Pat. No. 5,439,422.

The invention relates to a drive belt, in particular suitable for use in a continuously variable transmission, comprising at least one endless carrier, and transverse elements positioned on the carrier, the transverse elements being provided with one or more recesses for the accommodation of the carriers, while the recesses comprise at least one bearing surface and one top surface.

Such a drive belt is known from U.S. Pat. No. 5,004,450, and is used in particular in continuously variable transmissions. The drive belt in that case is placed around two pulleys. The pulleys each comprise two sheaves, the distance between which is adjustable. Varying the distance between the sheaves of the two pulleys will move the drive belt to different radial positions on the pulleys, with the result that the transmission ratio is adjustable.

It is also known from U.S. Pat. No. 4,854,919 that the geometrical design of the pulley/drive belt combination often causes the drive belt to run out of true between the two pulleys, so that it also runs slightly out of true into the pulleys. The transverse elements of the drive belt are consequently received in the pulley slightly tilted in a plane at right angles to the carriers. This phenomenon is recognized in U.S. Pat. No. 5,004,450, and is overcome there by designing the contact faces of the transverse elements in such a way that the tilted transverse elements automatically correct their position in the pulleys and straighten up. This works well per se, but the transverse elements, on account of their configuration and narrow tolerances, are difficult to produce and are relatively expensive. Great forces also occur, with the result that overdimensioning of the transverse elements is necessary.

The object of the invention is to provide a drive belt in which the tilting of the transverse elements is largely overcome, and which is also relatively simple to produce, is guaranteed to wedge well in the pulleys, and need not be overdimensioned. For this purpose, the invention is characterized in that in the tilted position of a transverse element in a plane at right angles to the carriers at least two points can be determined, a first point which determines a contact point of a bearing surface with one or more carriers, and a second point which determines a contact point of a top surface with one or more carriers, in a straight position of the transverse element in the axial direction of the drive belt the first point and the second point lying at a distance A from each other, and also in a straight position of the transverse element in the radial direction of the drive belt the carrier and the second point lying at a distance B from each other, in such a way that the arc tangent of the quotient B/A is less than 1°.

In the drive belt according to the invention, the transverse element, on the one hand, has sufficient play to position itself relative to the carriers and the pulleys, while, on the other hand, a tilting of the transverse elements is prevented in such a way that good wedging in the pulleys is ensured. The drive belt according to the invention is relatively simple and cheap to produce.

The invention can be used in particular for drive belts which use one or two carriers.

Particularly in the range in which the arc tangent is greater than 0.2° and smaller than 0.8°, the effectiveness is increased, and in particular an improved efficiency of the transmission is also obtained. The arc tangent is preferably approximately 0.5°.

According to a further development of the invention, one or more transverse elements are provided with projection/recess means, in which case a projection of one transverse element can be accommodated with some play in the recess of an adjacent transverse element. The play in this case is preferably essentially in the axial direction of the drive belt between projection and recess. This measure means that the transverse elements can position themselves in the optimum way not only relative to the pulley and the carriers, but also relative to the adjacent transverse elements.

The invention also relates to a transverse element suitable for use in the drive belt according to the invention.

The invention will be explained with reference to a drawing. In the drawing:

FIG. 1 shows a diagrammatic representation of a continuously variable transmission provided with a drive belt according to the invention;

FIG. 2 shows a top view of a drive belt running out of true into the pulley:

FIG. 3a shows a drive belt in cross-section, with a transverse element in the tilted position, for wedging in the pulley;

FIG. 3b shows a drive belt according to FIG. 3a during wedging in the pulley;

FIG. 4 shows a drive belt according to the invention in cross-section, with a transverse element in the straight position.

The continuously variable transmission 1 shown diagrammatically in FIG. 1 comprises a pulley 5 disposed on a first shaft 2, a pulley 5 disposed on a second shaft 4, and a drive belt 6 positioned around the pulleys 3, 5. The drive belt 6 comprises one or more endless carriers 7, which carriers themselves can consist of one or more rings combined to the form of a carrier. Transverse elements 8 are disposed on the carriers 7, which elements generally slide over the carriers 7. It is assumed here that the way in which the continuously variable transmission 1 works is known.

FIG. 2 shows in top view the run-in of the drive belt into the pulley 3 with sheaves 9, 10. As explained in detail in U.S. Pat. No. 4,854,919, the geometrical shape of the continuously variable transmission will often cause the drive belt 6 to run out of true into the pulley 3. The consequences of this running out of true can be largely overcome by the measures according to U.S. Pat. No. 4,854,919. The running out of true does cause the transverse elements 8 of the drive belt 6 to come into contact first with the sheave 10, and there is no contact yet with sheave 9. As a result, the transverse element 8 will be given an impulse in the direction of the sheave 9 and will consequently move slightly in the direction of sheave 9 again and rotate in direction R (FIG. 3a). Such a rotation and translation of the transverse element 8 is necessary for positioning between both the sheave 9 and the sheave 10. The transverse elements 8 are generally also provided with a projection 12 on one face and with a recess 12' on the opposite face, indicated here by a dotted line. The projection/recesses 12, 12' of adjacent transverse elements thereby engage with each other and guide this translation and rotation to some extent. For the rest, the projection/recess is not necessary for the embodiment of the invention.

Through the translation and in particular the rotation, the transverse element 8 will run out of true and will therefore also lie out of true between the sheaves 9, 10 of the pulley (FIG. 3b). The translation and rotation are absolutely essential for taking the transverse elements between the pulleys when the drive belt runs out of true, but in particular from the point of view of slippage, wear and efficiency, it is undesirable for the transverse elements to be out of true in the pulley.

In U.S. Pat. No. 5,004,450 the flanks 13, 14 of the transverse element 8 are shaped in such a way that the out-of-true position of the transverse element 8 is corrected automatically during wedging in the pulleys.

However, the invention aims largely to overcome this out-of-true position already before wedging in the pulleys, in which case the measures according to the US patent specification can also be applied.

As shown in FIG. 3b, the transverse element 8 will rotate, but is slightly impeded therein by carrier 7a. The rotation of the transverse element will therefore be about the first contact point 11 of carrier 7a with bearing surface 15 of the transverse element 8. On the other hand, the rotation is limited by a second contact point 16 of carrier 7b with top surface 17 of the transverse element 8.

FIG. 4 shows the drive belt 6 according to the invention in cross-section, with the transverse element 8 shown in the straight position. The first contact point 11 of the bearing surface 15 with carrier 7a in the case of tilting of the transverse element according to FIG. 3 and the second contact point 16 of the top surface 17 with the carrier 7b in the case of tilting of the transverse element according to FIG. 3 are also shown here.

The first and second contact points 11, 16 respectively lie in the axial direction of the drive belt 6 at a distance A. The carrier 7b and the second contact point 16 on the top surface 17 lie at a distance B. According to the invention, the drive belt must now be designed in such a way that the arc tangent of the quotient B/A is smaller than 1°. In this way the transverse element, on the one hand, gains sufficient freedom to translate and to rotate in order to position itself between the pulleys, while, on the other hand, the tilting of the transverse elements is restricted already before the wedging in the pulleys, in such a way that sufficient wedging of the transverse elements between the pulleys is obtained, with improved efficiency of the transmission, reduced slippage and reduced wear. The drive belt is also relatively easy and cheap to manufacture.

In practice, it is found that in the range where the arc tangent lies between 0.2° and 0.8° in particular, the effectiveness is improved and the efficiency increased. The arc tangent is preferably about 0.5°.

As can be seen in FIG. 2, it may be desirable for the transverse elements 8 on entering the pulley 3 to be capable of moving slightly relative to an adjacent transverse element in the axial direction 20 of the drive belt, in particular on contact with sheave 10. If transverse elements with projection/recess means 12, 12' are used, this movement can be impeded. For that reason, the projection 12 of a transverse element should preferably be accommodated with some play in the recess 12'. Since in the main a relative movement of the adjacent transverse elements in the axial direction 20 can be desirable or necessary, it is generally sufficient to have play in essentially the axial direction between projection 12 and recess 12'. This is shown in slightly exaggerated form in FIGS. 3a, 3b and 4, but it will be clear from FIG. 2 that a play which permits a relative movement of adjacent transverse elements in the axial direction 20 corresponding to the projected tangent in the axial direction 20 of the run-in hyperbola 21 of sheave 10 at the position of the transverse element in question will suffice.

It will be clear that the invention is not limited to the embodiments shown. For example, the invention can be applied in a corresponding way to drive belts where one carrier or more than two carriers are being used. The bearing surface and/or the top surface can also be profiled, e.g. convex, concave or slanting, possibly with an eccentric position of the top of the profiled surface. This profiling can be provided either in the lengthwise direction or in the transverse direction. The projection/recess means, if present, can also have different configurations, such as cylindrical or conical.

I claim:
1. A drive belt, comprising:
an endless carrier means;
a first element positioned transversely on said endless carrier means;
said first element being rotatable relative to said endless carrier means in a plane orthogonal to the longitudinal direction of said carrier means;
said first element further comprising a bearing surface having a first contact point and a top surface having a second contact point, the shortest distance between said second contact point and said bearing surface exceeding the thickness of said carrier means by a length B, and said first and second contact points disposed to engage opposite sides of said carrier means when said first element rotates, thereby impeding excessive rotation of said first element;
said first and second contact points defining the hypotenuse of a right triangle having its right angle vertex in the plane of said bearing surface, the distance between said right angle vertex and said first contact point defining a length A; and
the dimensions of said first element and said cattier means being chosen such that the arctangent of the quotient B/A is a non-zero value smaller than 1 degree.

2. The drive belt of claim 1 wherein said endless carrier means comprises first and second parallel endless carriers of substantially equal thickness, and wherein said first contact point is disposed to engage said first endless carrier and said second contact point is disposed to engage said second endless carrier.

3. The drive belt of claim 1 wherein said first element further comprises a portion that extends outside the loop defined by said endless carrier means, and wherein a first side of said portion comprises a first projection extending in the longitudinal direction of said carrier means, and wherein a second side of said portion defines a recess for receiving a second projection provided by a second element similar to said first element, and wherein the width of said recess measured in the axial direction of the drive belt is larger than the width of said first projection measured in the axial direction of the drive belt, such that said first and second elements may move relative to one another in the axial direction of the drive belt, and wherein said first projection and said recess are both located substantially outside the loop defined by said endless carrier means.

4. The drive belt of claim 2 wherein said first element further comprises a portion that extends outside the loop defined by said endless carrier means, and wherein a first side of said portion comprises a first projection extending in the longitudinal direction of said carrier means, and wherein a second side of said portion defines a recess for receiving a second projection provided by a second element similar to said first element, and wherein the width of said recess measured in the axial direction of the drive belt is larger than the width of said first projection measured in the axial direction of the drive belt, such that said first and second elements may move relative to one another in the axial direction of the drive belt, and wherein said first projection and said recess are both located substantially outside the loop defined by said endless carrier means.

* * * * *

UNITED STATES PATENT AND TRADEMARK OFFICE
CERTIFICATE OF CORRECTION

PATENT NO. : 5,533,940
DATED : July 9, 1996
INVENTOR(S) : Paulus M. Smeets

It is certified that error appears in the above-indentified patent and that said Letters Patent is hereby corrected as shown below:

Column 4, line 29, "cattier means" should read --carrier means--

Signed and Sealed this

Seventh Day of January, 1997

Attest:

BRUCE LEHMAN

*Attesting Officer*  *Commissioner of Patents and Trademarks*